(12) United States Patent
Takayanagi

(10) Patent No.: US 10,091,424 B2
(45) Date of Patent: Oct. 2, 2018

(54) IMAGE BLUR CORRECTION APPARATUS, METHOD FOR CONTROLLING THE SAME, AND STORAGE MEDIUM

(71) Applicant: CANON KABUSHIKI KAISHA, Tokyo (JP)

(72) Inventor: Wataru Takayanagi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/359,067

(22) Filed: Nov. 22, 2016

(65) Prior Publication Data

US 2017/0155842 A1    Jun. 1, 2017

(30) Foreign Application Priority Data

Nov. 27, 2015 (JP) ................. 2015-232264

(51) Int. Cl.
| | |
|---|---|
| *H04N 5/232* | (2006.01) |
| *G06T 5/50* | (2006.01) |
| *G06T 7/20* | (2017.01) |
| *G06T 5/00* | (2006.01) |

(52) U.S. Cl.
CPC ......... *H04N 5/23267* (2013.01); *G06T 5/003* (2013.01); *G06T 5/50* (2013.01); *G06T 7/20* (2013.01); *H04N 5/2328* (2013.01); *H04N 5/23254* (2013.01); *H04N 5/23261* (2013.01); *G06T 2207/10016* (2013.01); *G06T 2207/20021* (2013.01); *H04N 5/23219* (2013.01)

(58) Field of Classification Search
None
See application file for complete search history.

(56) References Cited

U.S. PATENT DOCUMENTS

| | | | | |
|---|---|---|---|---|
| 7,773,828 | B2 * | 8/2010 | Sakata ............... | H04N 5/23248 345/634 |
| 8,059,951 | B2 * | 11/2011 | Miyamori ............ | G02B 27/646 359/557 |
| 2006/0115297 | A1 * | 6/2006 | Nakamaru ......... | H04N 5/23248 399/163 |
| 2008/0186386 | A1 * | 8/2008 | Okada ................ | H04N 5/23248 348/208.4 |

(Continued)

FOREIGN PATENT DOCUMENTS

JP    H04-163535 A    6/1992

*Primary Examiner* — Shahbaz Nazrul
(74) *Attorney, Agent, or Firm* — Canon U.S.A., Inc. IP Division

(57) ABSTRACT

An image blur correction apparatus includes a first detection unit configured to detect motion vectors in plural different areas using a plurality of images, a determination unit configured to determine an amount of movement of a main object based on the motion vectors in the plural different areas detected by the first detection unit, and a control unit configured to correct an image blur of the main object based on the amount of movement of the main object determined by the determination unit. The determination unit determines a center of gravity or a peak movement amount of which value is included in a determination range near zero (0) among plural amounts of movement represented by the motion vectors in the plural different areas to be the amount of movement of the main object.

13 Claims, 18 Drawing Sheets

(56) References Cited

U.S. PATENT DOCUMENTS

| | | | | |
|---|---|---|---|---|
| 2009/0196461 | A1* | 8/2009 | Iwamoto | G03B 7/28 |
| | | | | 382/103 |
| 2010/0208944 | A1* | 8/2010 | Fukunishi | G06T 5/50 |
| | | | | 382/107 |
| 2012/0033092 | A1* | 2/2012 | Sugaya | H04N 5/23254 |
| | | | | 348/208.1 |
| 2012/0155727 | A1* | 6/2012 | Orderud | G06T 7/262 |
| | | | | 382/131 |
| 2015/0002684 | A1* | 1/2015 | Kuchiki | H04N 5/23232 |
| | | | | 348/208.4 |
| 2016/0044245 | A1* | 2/2016 | Tsubaki | H04N 5/23287 |
| | | | | 348/208.11 |
| 2016/0301871 | A1* | 10/2016 | Kuchiki | H04N 5/23261 |

* cited by examiner

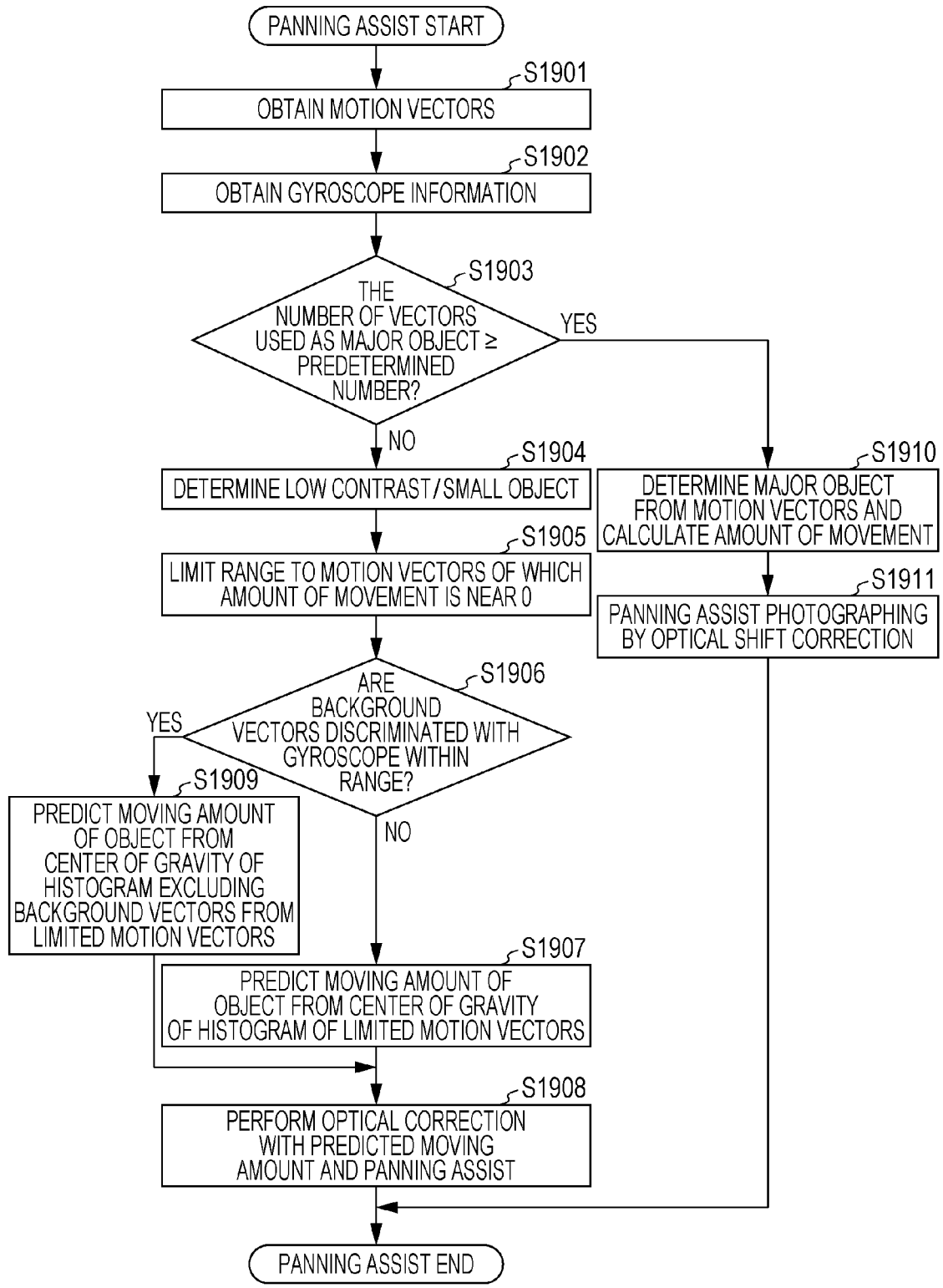

IMAGE BLUR CORRECTION APPARATUS, METHOD FOR CONTROLLING THE SAME, AND STORAGE MEDIUM

BACKGROUND OF THE INVENTION

Field of the Invention

The present disclosure generally relates to a technique of correcting an image blur which occurs during panning with an image capturing apparatus and, more particularly, to an image blur correction apparatus, a method for controlling the same, and a storage medium.

Description of the Related Art

Panning has been known as a photographing technique to express a sense of speed of a moving object. This photographing technique is for causing a moving object to be static while a background to be blurred by a photographer panning a camera in accordance with a motion of the object. In panning, a photographer needs to pan the camera in accordance with a motion of the object. If a panning speed is excessively high or excessively low, a difference may arise between a moving speed of the object and the panning speed, whereby an image blur often occurs in an image of the object.

Japanese Patent Laid-Open No. 4-163535 discloses a method for correcting a shake of an object by moving a part of an optical system of a lens being exposed or an image capturing unit based on a "relative angular velocity of an object with respect to the image capturing apparatus calculated before the exposure" and an "angular velocity of the image capturing apparatus being exposed obtained from an angular velocity sensor." The relative angular velocity of the object with respect to the image capturing apparatus is calculated from a "moving amount of the object on an image plane detected from temporally continuous images" and output of the "angular velocity sensor."

In the related art method disclosed in Japanese Patent Laid-Open No. 4-163535, the moving amount for correcting a shake of the image of the object (i.e., an object shake) is calculated by moving a part of the optical system being exposed or the image capturing unit using a moving amount of the object on the image plane and the angular velocity of the image capturing apparatus. This calculation is performed on the premise that values of the "moving amount of the object on an image plane detected from temporally continuous images" and the "angular velocity of the image capturing apparatus being exposed obtained from the angular velocity sensor" are correct. For example, in an algorithm for detecting the "moving amount of the object on an image plane detected from temporally continuous images," there is a problem that the moving amount of the object cannot be calculated unless the moving amount on the image plane equal to or greater than a predetermined threshold is detected. An exemplary case where a moving amount on an image plane equal to or greater than a predetermined threshold is not detected may be a case where case a necessary moving amount on an image plane is not obtained because the object focused on an angle of view to be focused on an image pickup device is small. There is also a case where a necessary moving amount on an image plane is not obtained if the object focused on the image pickup device has a low contrast.

In these cases, the operation to correct a shake of the object by moving a part of the optical system or the image capturing unit is ceased in the related art method.

SUMMARY OF THE INVENTION

The present disclosure provides an image blur correction apparatus capable of assisting panning also in a situation where a moving amount of an object on an image plane is not easily obtained correctly.

According to an aspect of the present disclosure, an image blur correction apparatus includes a first detection unit configured to detect motion vectors in plural different areas using a plurality of images, a determination unit configured to determine an amount of movement of a main object based on the motion vectors in the plural different areas detected by the first detection unit, a control unit configured to correct an image blur of the main object based on the amount of movement of the main object determined by the determination unit, wherein the determination unit determines a center of gravity or a peak movement amount of which value is included in a determination range near zero (0) among plural amounts of movement represented by the motion vectors in the plural different areas to be the amount of movement of the main object.

Further features of the present disclosure will become apparent from the following description of exemplary embodiments with reference to the attached drawings.

BRIEF DESCRIPTION OF THE DRAWINGS

FIG. 18 is a flowchart illustrating a panning assist operation in a fourth embodiment.

DESCRIPTION OF THE EMBODIMENTS

Hereinafter, embodiments of the present disclosure will be described with reference to the drawings.

First Embodiment

Figure 1:
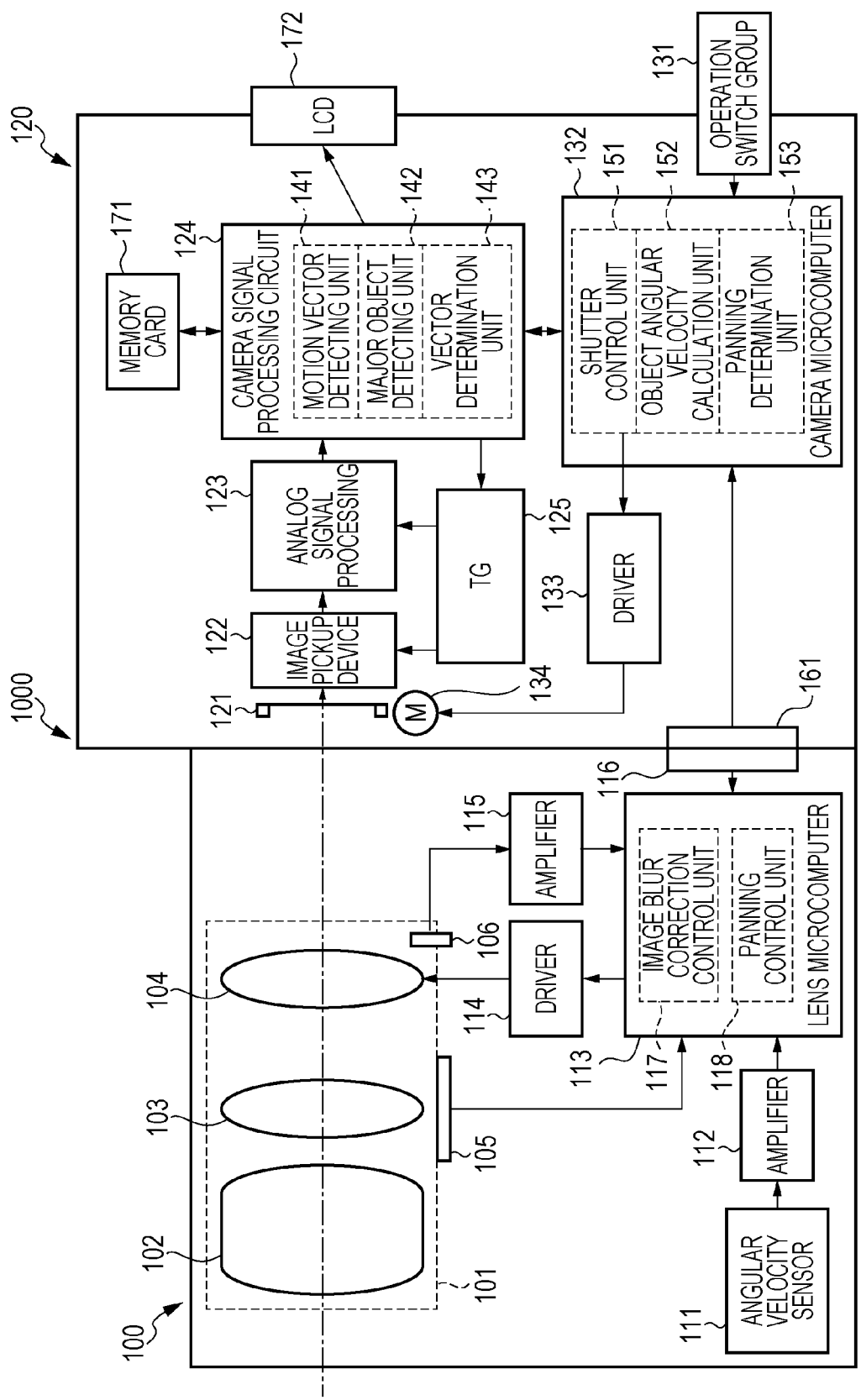
FIG. 1 is a block diagram illustrating a configuration of a camera which is a first embodiment of an image capturing apparatus on which an image blur correction apparatus of the present disclosure is mounted.

FIG. 1 is a block diagram illustrating a configuration of a camera which is a first embodiment of an image capturing apparatus on which an image blur correction apparatus of the present disclosure is mounted. In FIG. 1, a camera 1000 is constituted by a camera body 120 on which an interchangeable lens 100 is removably mounted. The interchangeable lens 100 is provided with a photographing lens unit 101 which includes a main photographing optical system 102, a zoom lens group 103 with a changeable focal length, and a shift lens group 104 which optically corrects an image blur with respect to an optical axis caused by a shake of the camera 1000 by moving to a direction perpendicularly crossing the optical axis. The interchangeable lens 100 further includes a zoom encoder 105 which detects a position of the zoom lens group 103, a position sensor 106 which detects a position of the shift lens group 104, and an angular velocity sensor 111 which detects a shake of the camera. The interchangeable lens 100 further includes an amplifier 112 which amplifies output of the angular velocity sensor 111, a microcomputer 113 for controlling the lenses (hereinafter, "lens microcomputer"), and a driver 114 which drives the shift lens group 104. The interchangeable lens 100 further includes an amplifier 115 which amplifies output of the position sensor 106 of the shift lens group 104, and a mount contact portion 116 for electrical connection with the camera body 120.

The lens microcomputer 113, which may include one or more processors and one or more memories, includes an image blur correction control unit 117 which performs image blur correction control, and a panning control unit 118 which performs control for panning assist. The lens microcomputer 113 also performs focus lens control, diaphragm control, etc., but control units therefor are not illustrated for the ease of description. For the image blur correction, a shake is detected and an image blur is corrected in the same manner about two axes, e.g., in a horizontal direction and in a vertical direction which cross perpendicularly. Therefore, description will be given only about one of these axes. As used herein, the term "unit" generally refers to hardware, firmware, software or other component, such as circuitry, alone or in combination thereof, that is used to effectuate a purpose.

The camera body 120 includes a shutter 121, an image pickup device 122, such as a complementary metal-oxide semiconductor (CMOS) sensor, an analog signal processing circuit 123, a camera signal processing circuit 124, and a timing generator 125 which sets an operation timing of the image pickup device 122 and the analog signal processing circuit 123. The camera body 120 further includes an operation switch group 131 constituted by a power switch, a release switch, a selecting switch of a panning assist mode, etc., and a microcomputer 132 for controlling a camera system which controls the entire camera (hereinafter, "camera microcomputer"). The camera body 120 further includes a motor 134 for driving the shutter, and a driver 133 which drives the motor 134 for driving the shutter. The camera body 120 further includes a memory card 171 which records a photographed image, and a liquid crystal panel (hereinafter, "LCD") 172 which monitors an image to be photographed with the camera and displays a photographed image. The camera body 120 further includes a mount contact portion 161 with the interchangeable lens 100. The lens microcomputer 113 and the camera microcomputer 132 perform serial communication at predetermined timing via mount contact portions 116 and 161.

The camera signal processing circuit 124 includes a motion vector detection unit 141 and a main object detection unit 142, and limits the motion vectors to a range of an amount of movement of near zero (0) when a main object cannot be detected by the main object detection unit 142. The camera signal processing circuit 124 includes a vector determination unit 143 which obtains a center of gravity within a limited range or a peak of the motion vectors. The camera microcomputer 132 includes a shutter control unit 151, an object angular velocity calculation unit 152 which calculates an angular velocity of the main object from the motion vectors obtained by the processing of the main object detection unit 142 and the vector determination unit 143, and a panning determination unit 153.

In FIG. 1, when the camera 1000 is powered on by the operation switch group 131, the camera microcomputer 132 detects the change of state, and power supply and initial setting to each circuit of the camera body 120 are performed by control of the camera microcomputer 132. The interchangeable lens 100 is supplied with power, and initial setting in the interchangeable lens 100 is performed by control of the lens microcomputer 113. Communication is started at predetermined timing between the lens microcomputer 113 and the camera microcomputer 132. With this communication, a condition of the camera body 120, photographing setting, etc. are transmitted from the camera body 120 to the interchangeable lens 100 at predetermined timing, and focal distance information of the lens, angular velocity information, etc. are transmitted from the interchangeable lens 100 to the camera body 120 at predetermined timing.

In a normal mode in which no panning assist mode setting is set, the angular velocity sensor 111 in the interchangeable lens 100 detects a shake of the camera 1000 caused by a shake, etc. Using the detection result, the shift lens group 104 is driven by the image blur correction control unit 117 and an image blur correction operation is performed.

Figure 2:
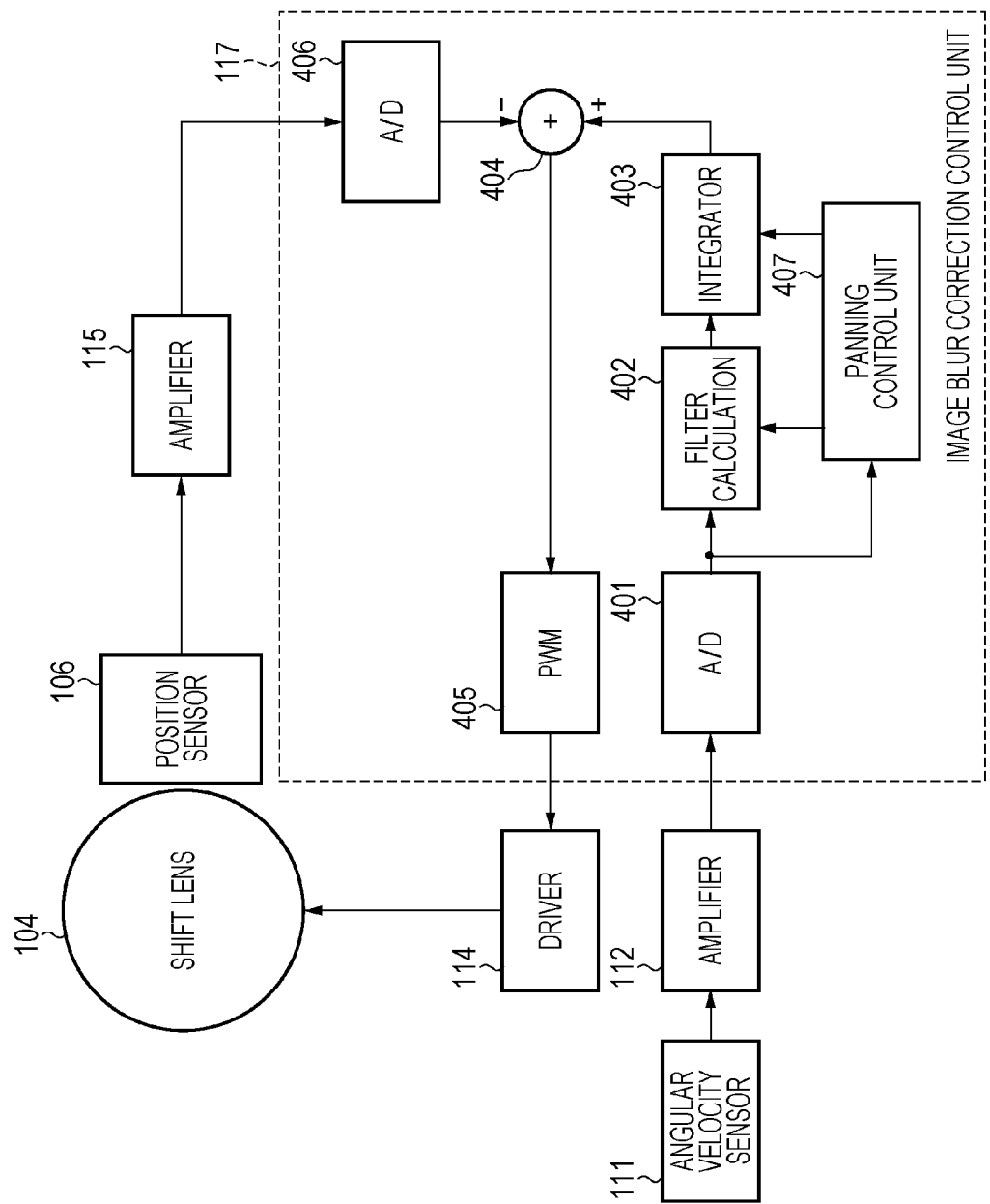
FIG. 2 is a block diagram illustrating an exemplary configuration of the image blur correction apparatus.

An image blur correction function will be described. FIG. 2 is a block diagram illustrating a configuration of the image blur correction apparatus, in which the same components as those of FIG. 1 are denoted by the same reference numerals and description thereof will be omitted. In FIG. 2, the image blur correction control unit 117 includes an analog to digital (A/D) converter 401, a filter calculation unit 402, an integrator 403, an adder 404, a pulse width modulation (PWM) output unit 405, an A/D converter 406, and a panning control unit 407. The A/D converter 401 converts a shake signal detected by the angular velocity sensor 111 into a digital signal. Output data of the angular velocity sensor 111 is sampled at a frequency of about 1 to 10 kHz. The filter calculation unit 402 constituted by a highpass filter (HPF) etc. performs a measure against panning by removing an offset component included in the output of the angular velocity sensor 111 and changing a cut-off frequency. The integrator 403 converts angular velocity data into angular displacement data in order to generate drive target data of the shift lens group 104. The A/D converter 406 converts output of the position sensor 106 which detects the position of the shift lens group 104 into digital data. The adder 404 calculates data of an actual driving amount of the shift lens group 104 by subtracting the current shift lens position from the drive target value of the shift lens group 104. The PWM output unit 405 outputs data of the calculated driving amount to the driver 114 for driving the shift lens. The panning control unit 407 determines whether the camera 1000 is being panned based on the condition of the angular velocity data. If it is determined that the camera 1000 is being panned, the panning control unit 407 performs change control of the cut-off frequency of the filter calculation unit 402 and adjusts output of the integrator 403.

Figure 3:
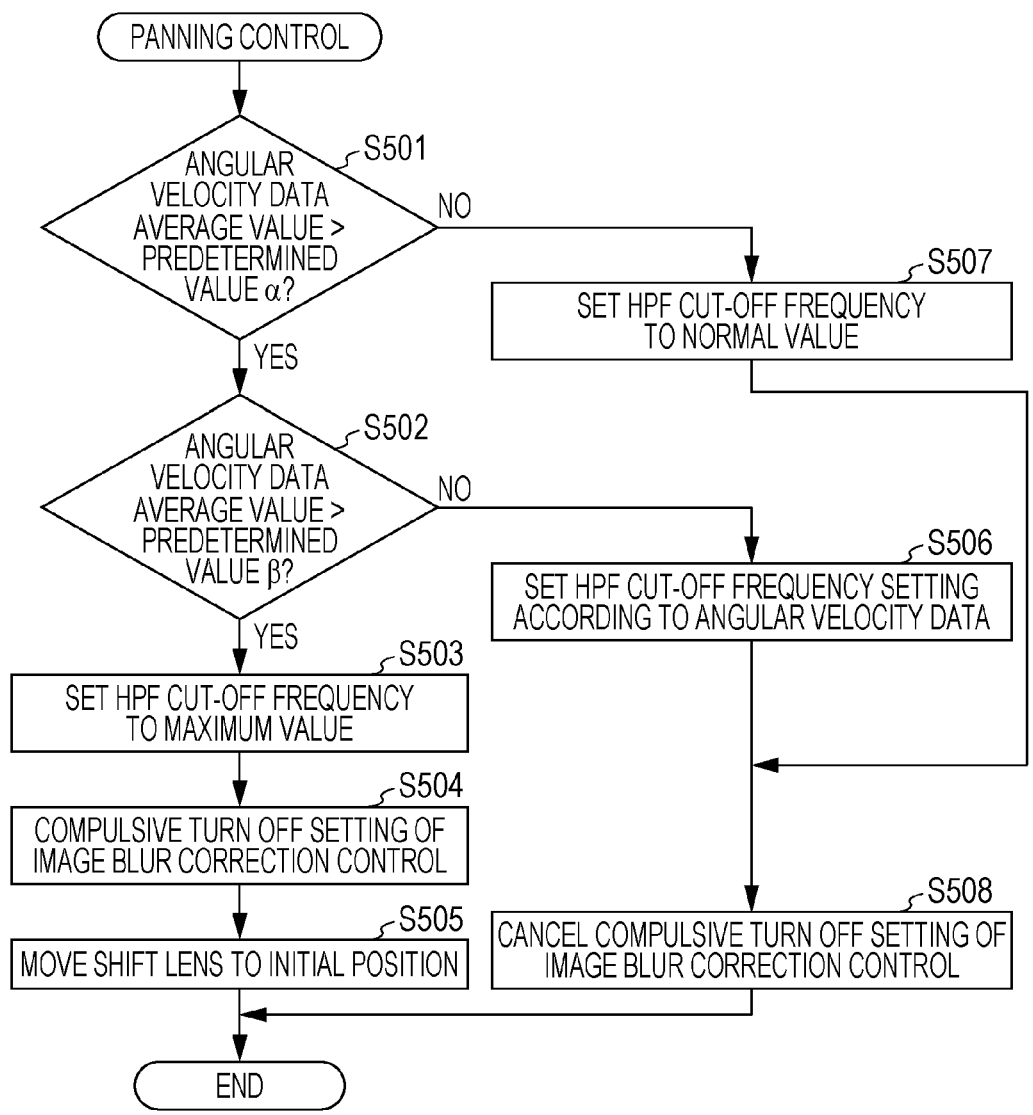
FIG. 3 is a flowchart illustrating an exemplary operation of panning control.

FIG. 3 is a flowchart illustrating an exemplary operation of panning control by the image blur correction control unit 117 in the lens microcomputer 113. Hereinafter, panning control will be described with reference to FIG. 3.

In FIG. 3, it is determined in S501 whether an average value of angular velocity data converted into a digital value by the A/D converter 401 (i.e., an average value of the number of predetermined sampling times) is larger than a predetermined value α. If the average value is equal to or smaller than the predetermined value α, it is determined that panning is not performed. If the average value is larger than the predetermined value α, it is determined in S502 whether the average value is larger than a predetermined value β. If the average value is equal to or smaller than the predetermined value β, it is determined that slow panning is being performed. If the average value is larger than the predetermined value β, it is determined that quick panning is being performed, the cut-off frequency of the HPF which is in the filter calculation unit 402 is set to be a maximum value in S503, and the image blur correction control is compulsorily turned off in S504. This is to stop the shift lens gradually by setting the cut-off frequency of the HPF to be high, and to eliminate unpleasant sensation when the image blur correction control is turned off. Further, since a moving amount by the panning is very large with respect to the magnitude of a shake during quick panning, there is no unpleasant sensation if a shake remains by turning the image blur correction off. If this setting is not performed and panning is to be corrected as a large shake, the shake of the image is stopped when panning is started, but the image will suddenly move greatly at the moment when the shift lens group 104 reaches a correction end, which may appear as a very unnatural movement of the image.

Then, in S505, the shift lens group 104 is moved to an initial position by gradually changing output of the integrator 403 into data of the initial position from the current data. This is because it is desirable that the shift lens group 104 is positioned at an initial position in a driving range at the time of resuming the image blur correction operation.

If the average value of the angular velocity data is equal to or smaller than the predetermined value β in S502 (i.e., if it is determined that slow panning is being performed), the routine proceeds to S506. The cut-off frequency of the HPF is set depending on the magnitude of the angular velocity data. This is because an influence of a shake cannot be completely ignored if slow panning is being performed, and the shake is corrected while keeping trackability of an image during panning so as not to be unnatural.

If the average value of the angular velocity data is equal to or smaller than the predetermined value α (i.e., if it is determined that no panning is being performed) in S501, the cut-off frequency of the HPF is set to a value of that of ordinary time in S507. If the panning is not quick panning, compulsive turn-off setting of the image blur correction control is canceled in S508.

Figure 4:
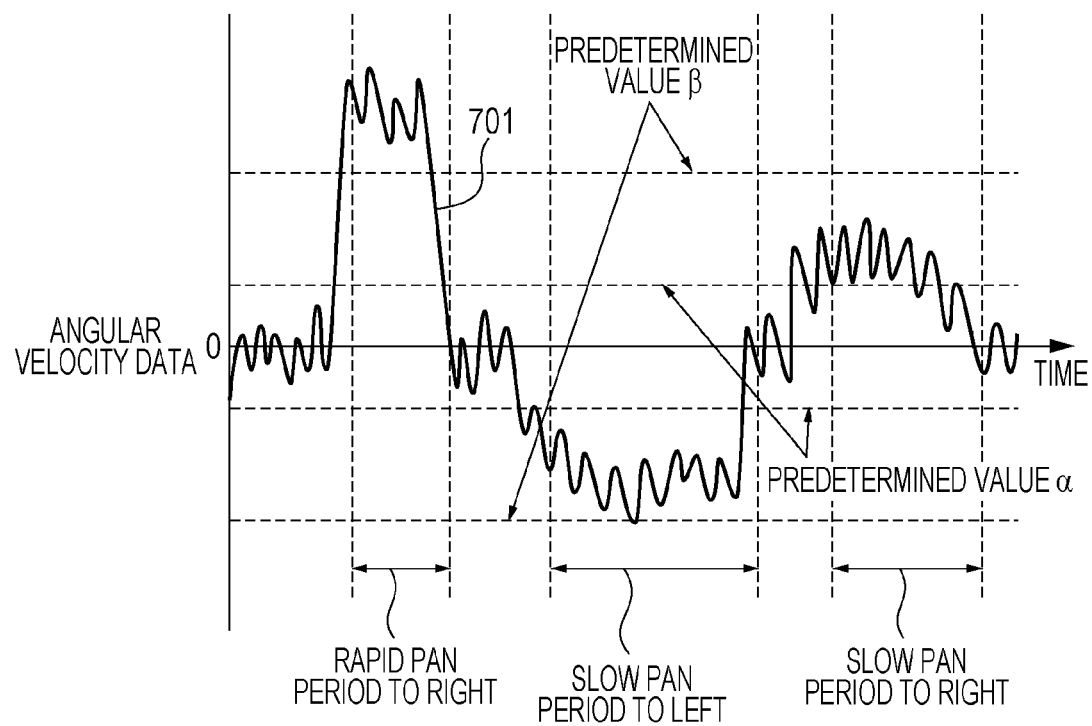
FIG. 4 illustrates a relationship between angular velocity data in a horizontal direction during panning and predetermined values $\alpha$ and $\beta$.

FIG. 4 illustrates a relationship between angular velocity data in the horizontal direction while panning is performed and the predetermined values α and β. FIG. 4 illustrates exemplary angular velocity data 701. In this example, when the camera 1000 is panned to the right, direction of output is positive and, when the camera 1000 is panned to the left, direction of output is negative. In the example of FIG. 4, rapid panning to the right and slow panning in the left and right directions are detected. As illustrated in FIG. 4, the angular velocity data departs from the initial value (here, 0) during panning. Therefore, if a drive target value of the shift lens is calculated by integrating the angular velocity data 701, output of the integrator 403 will become a very large value due to a direct current (DC) offset component, whereby control becomes impossible. Therefore, when panning is detected, it is necessary to cut the DC component by changing the cut-off frequency of the HPF to be high. Since this phenomenon becomes especially remarkable during rapid panning, output of the integrator 403 is kept from increasing by further increasing the cut-off frequency. Since a movement of the image by the panning becomes very large with respect to the shake if the panning speed is high, unpleasant sensation does not occur when the image blur correction function is turned off in the panning direction. By performing the panning control as described above, an image without unpleasant sensation can be monitored in the display of a live view image during panning.

Next, the panning assist mode will be described. In FIG. 1, when the panning assist mode is set by the operation switch group 131, the camera microcomputer 132 switches the control to the control for panning assist. The information is transmitted to the lens microcomputer 113 from the camera microcomputer 132, and the lens microcomputer 113 shifts to the panning assist mode.

In the camera body 120 in the panning assist mode, the motion vector detection unit 141 in the camera signal processing circuit 124 detects and outputs motion vectors of an object on a screen from photographed image information. The camera microcomputer 132 receives the motion vectors and angular velocity data detected by the angular velocity sensor 111 from the lens microcomputer 113.

Since the angular velocity data corresponds to the panning speed of the camera 1000, a difference between the angular velocity data and the angular velocity calculated from the moving amount of the main object on the image plane and the current focal length of the lens becomes an angular velocity of the main object with respect to the camera 1000. The camera microcomputer 132 transmits the calculated angular velocity data of the main object to the lens microcomputer 113.

Figure 5:
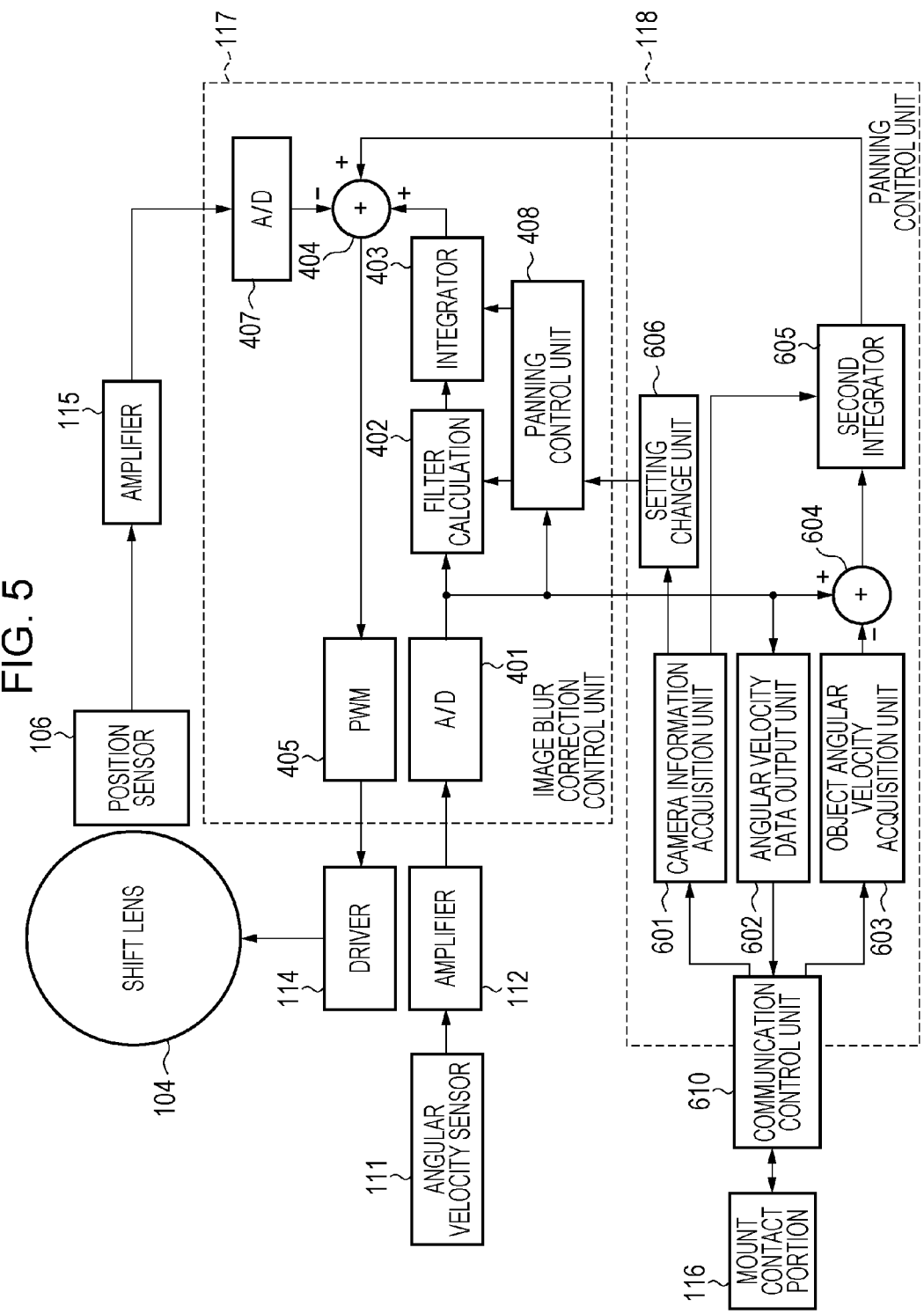
FIG. 5 illustrates a configuration of the image blur correction apparatus in a panning assist mode.

FIG. 5 is a block diagram illustrating a configuration of the image blur correction apparatus in the panning assist mode, in which the same components as those of FIGS. 1 and 2 are denoted by the same reference numerals and description thereof will be omitted. In FIG. 5, the panning control unit 118 includes a camera information acquisition unit 601, an angular velocity data output unit 602, an object angular velocity acquisition unit 603, an adder 604, a second integrator 605, and a setting change unit 606. The camera information acquisition unit 601 especially obtains setting information of the panning assist mode and release information of the camera body 120. The angular velocity data output unit 602 samples the angular velocity data of the camera 1000 detected by the angular velocity sensor 111 at predetermined timing, and outputs the sampled angular velocity data to the object angular velocity calculation unit 152 of the camera microcomputer 132 via the communication control unit 610 and the mount contact portion 116. The object angular velocity acquisition unit 603 obtains angular velocity information of the main object necessary for the panning assist from camera information obtained by the communication with the camera microcomputer 132 via the mount contact portion 116 and the communication control unit 610. The adder 604 calculates a difference between the angular velocity of the angular velocity sensor and the angular velocity of the object. The second integrator 605 performs integration only in a predetermined period. The setting change unit 606 changes setting depending on mode information obtained by the camera information acquisition unit 601. The communication control unit 610 performs two-way communication with the camera microcomputer 132.

In the panning determination unit 153 in the camera body 120, the angular velocity data transmitted from the lens microcomputer 113 can be integrated and stored. Thus, when the user performs panning, an angle change (hereinafter, a "panning angle") of the camera 1000 on the basis of predetermined timing can be obtained.

When the panning assist mode is set by an operation of the operation switch group 131, the information is read by the camera information acquisition unit 601 via the communication control unit 610, and is notified to the setting change unit 606. The setting change unit 606 performs a setting change of the panning control unit 408 in accordance with the notified mode information. The setting change performed here is a change for easy shift to rapid panning, and, specifically, a change of the predetermined values β and α for the determination of panning described above.

Motion angular velocity information about the main object transmitted from the camera body 120 to the lens microcomputer 113 is read by the object angular velocity acquisition unit 603. The adder 604 calculates a difference between the angular velocity detected by the angular velocity sensor 111 and the angular velocity of the main object, and transmits the calculated difference to the second integrator 605. The second integrator 605 starts integration with the signal representing that it is in an exposure period obtained by the camera information acquisition unit 601, and outputs a value of which a position of the shift lens becomes a center in other periods. Here, if the shift lens is to be disposed at the central position except for the exposure period, the shift lens will move rapidly from the current position of the shift lens to the central position at the time of an end of the exposure period. However, since readout of the image signal from the image pickup device 112 is performed immediately after the end of the exposure period, the image on the LCD disappears. Therefore, the movement of the image due to the rapid motion of the shift lens does not cause a problem. Output of the second integrator 605 is added with output of the integrator 403 and position information about the shift lens group 104 in the adder 404, and a driving amount of the shift lens group 104 is calculated.

If a panning operation is performed by a photographer when the panning assist mode is set, the panning control unit 408 immediately performs panning control with respect to the rapid panning condition. With the panning control, an image blur correction operation is inhibited and the shift lens group 104 corrects an amount corresponding to the difference between the angular velocity of panning of the camera 1000 and the angular velocity of the object. Therefore, a difference between the panning speed of the camera 1000 in the exposure period and the speed of the object which may cause a failure of panning is offset in the operation of the shift lens, and panning is performed successfully (i.e., assisted).

Figure 6:
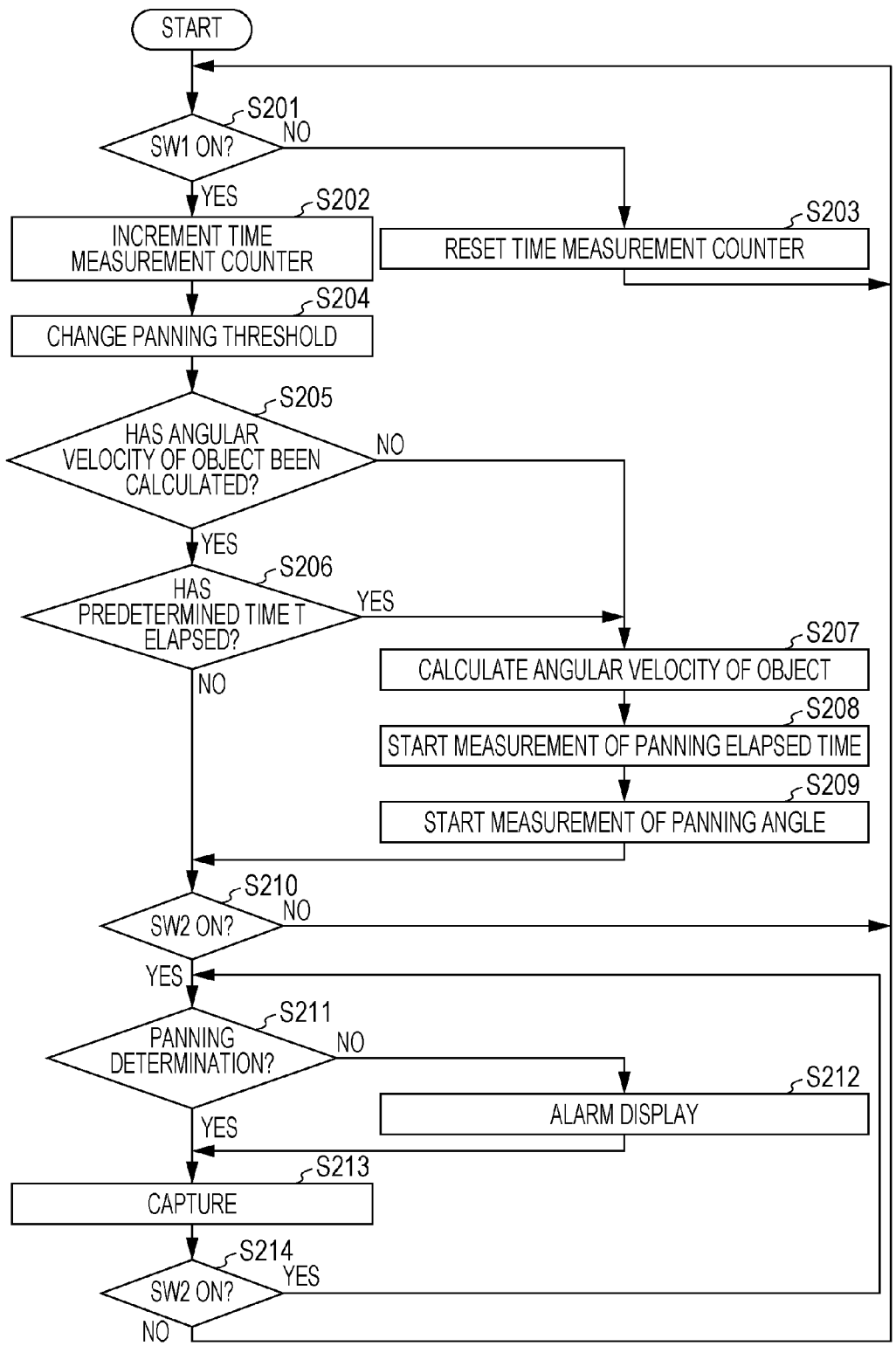
FIG. 6 is a flowchart illustrating a photographing operation in the panning assist mode.

FIG. 6 is a flowchart illustrating a photographing operation in the panning assist mode. In FIG. 6, whether the release switch is half-pressed (i.e., a switch SW1 is turned on) is detected in S201. If the SW1 is turned on, the routine proceeds to S202, where a time measurement counter is incremented. If the SW1 is not turned on, the time measurement counter is reset in S203 until the SW1 is turned on.

In S204, a threshold for determination of the motion vectors is changed, and whether the motion vectors are output from the main object, output from a background, output from other moving body, or detected wrongly is determined. In this manner, an influence of erroneous detection is reduced and accuracy of the motion vectors used for the calculation of the object angular velocity in S207 is increased.

In S205, whether the angular velocity of the main object has already been calculated is confirmed. If the angular velocity of the main object has already been calculated, whether the time measurement counter has been set to predetermined time T is confirmed in S206. If the angular velocity of the main object has not been calculated, or if a certain period of time has elapsed after the angular velocity is calculated, the angular velocity of the main object is calculated in S207. The angular velocity of the main object is recalculated in consideration of a case where the speed of the main object changes with time. Whenever the angular velocity of the main object is calculated, the calculated angular velocity is transmitted to the lens microcomputer 113.

In S208, panning elapsed time is reset and a measurement of the elapsed time is started. In S209, the panning angle which is integrated by the panning determination unit 153 is reset, and a measurement of the panning angle is started. In S210, whether the release switch is pressed fully (i.e., the switch SW2 is turned on) is detected. If the SW2 is not turned on, the routine returns to S201. If the SW2 is turned on in S210, later-described panning determination is performed in S211. If panning is allowed, photographing is performed in the current camera setting in S213. If panning is not allowed, a notification is displayed on the LCD 172 in S212, and photographing in S213 is performed. Next, in S214, whether the release switch is pressed fully (i.e., the switch SW2 is turned on) is determined. If the SW2 is turned on, the routine returns to S211, where the next image photographing is started. If the SW2 is not turned on, the routine returns to S201.

Figure 7:
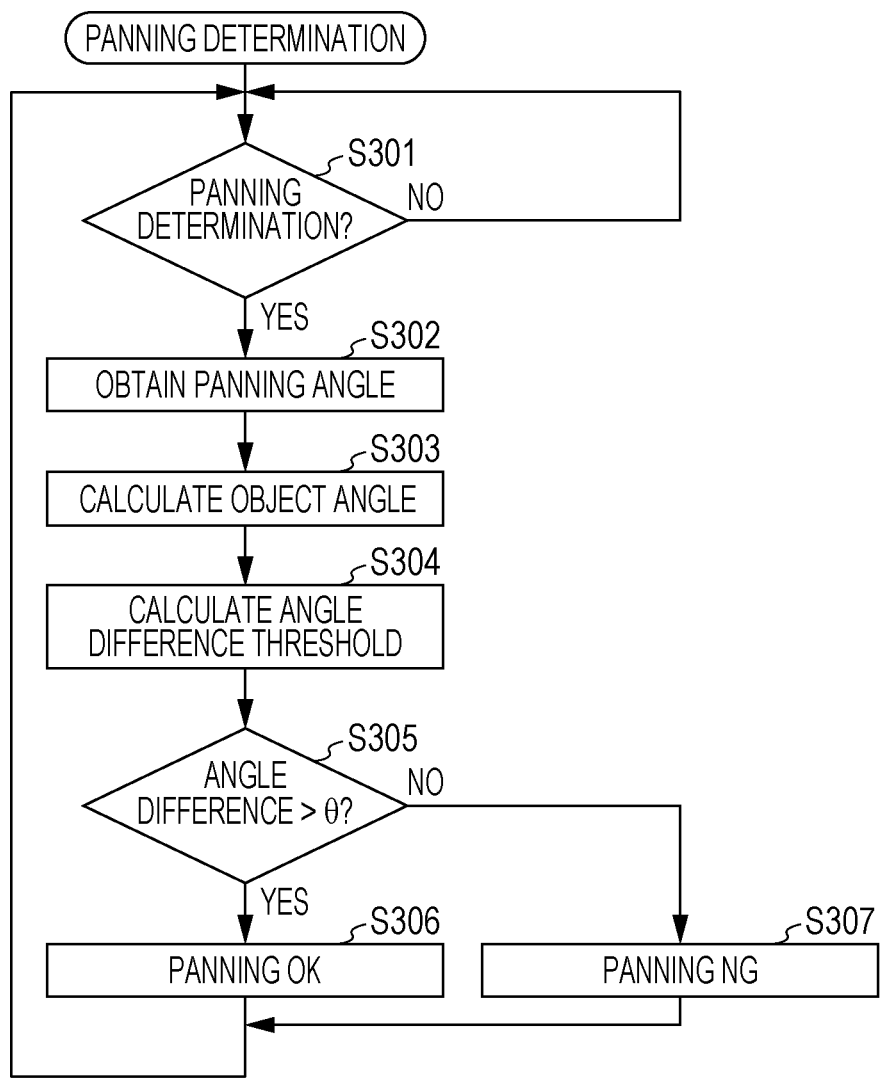
FIG. 7 is a flowchart illustrating processing performed in a panning determination unit.

FIG. 7 is a flowchart illustrating processing performed by the panning determination unit 153 in the camera microcomputer 132. In S301, whether the camera 1000 is in the panning assist mode is determined. If the camera 1000 is in the panning assist mode, the routine proceeds to S302, and if not in the panning assist mode, the routine returns to S301.

In S302, the panning angle is obtained. In S303, an object angle (a predicted object angle) when the object keeps the object angular velocity is calculated from the angular velocity of the object and the panning elapsed time. In S304, a threshold (a panning threshold) of the angle for performing panning determination is calculated. The panning threshold becomes smaller as the focal length becomes longer (i.e., an angle of view becomes smaller). Here, the threshold is an angle of view calculated from the focal length. In S305, an absolute value of a difference between the predicted object angle and the panning angle is compared with the panning threshold and, if the threshold is smaller, the routine proceeds to S306 and, otherwise, proceeds to S307. A cancel of the panning assist mode is notified to the lens microcomputer 113 so that panning is allowed in S306 and not allowed in S307.

Figure 8:
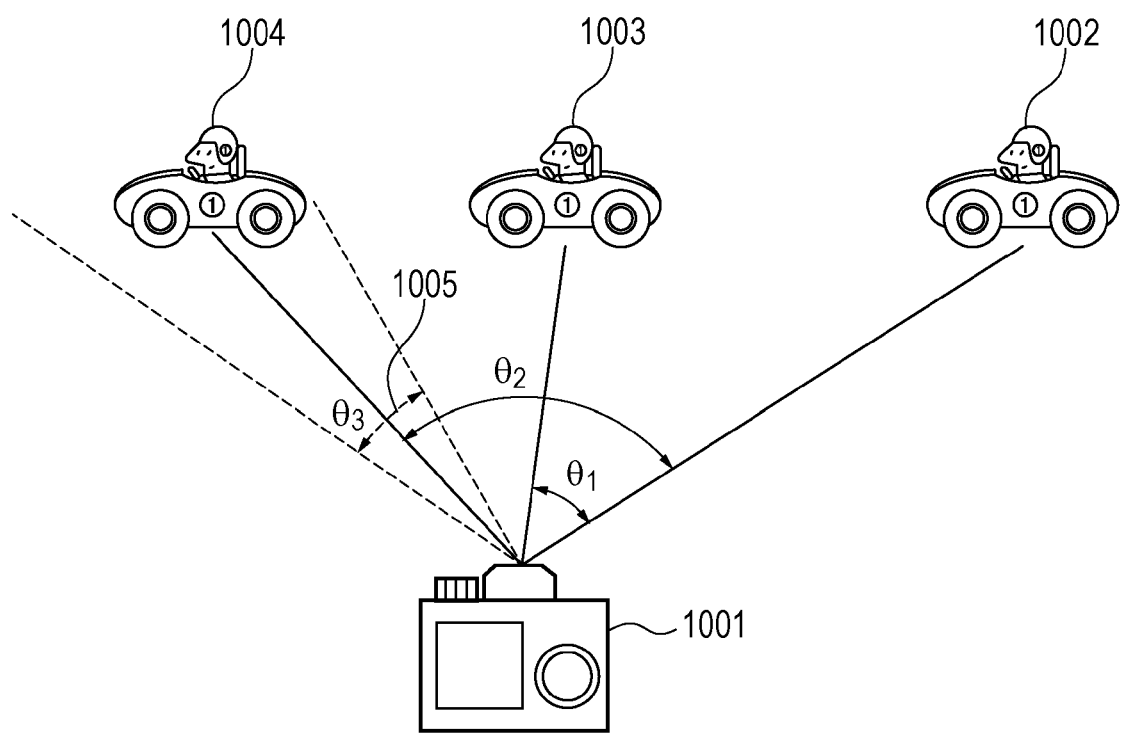
FIG. 8 is a conceptual diagram of control of the panning determination unit.

FIG. 8 is a conceptual diagram of control of the panning determination unit 153. In FIG. 8, the reference numeral 1001 denotes a camera and 1002 denotes a position of the object at timing at which the object angular velocity is calculated. The reference numeral 1003 denotes a position of the object when the object is moved at the calculated object angular velocity, and an angle from 1002 to 1003 is defined as a virtual object angle θ1. The reference numeral 1004 denotes a position of the actual object calculated from the information from the angular velocity sensor 111, and an angle from 1002 to 1004 is defined as a panning angle θ2. The reference numeral 1005 is an angle of view θ3 at the time of photographing. Therefore, if θ3 is smaller than |θ1-θ2|, allowance of the panning assist photographing is determined.

Figure 9:
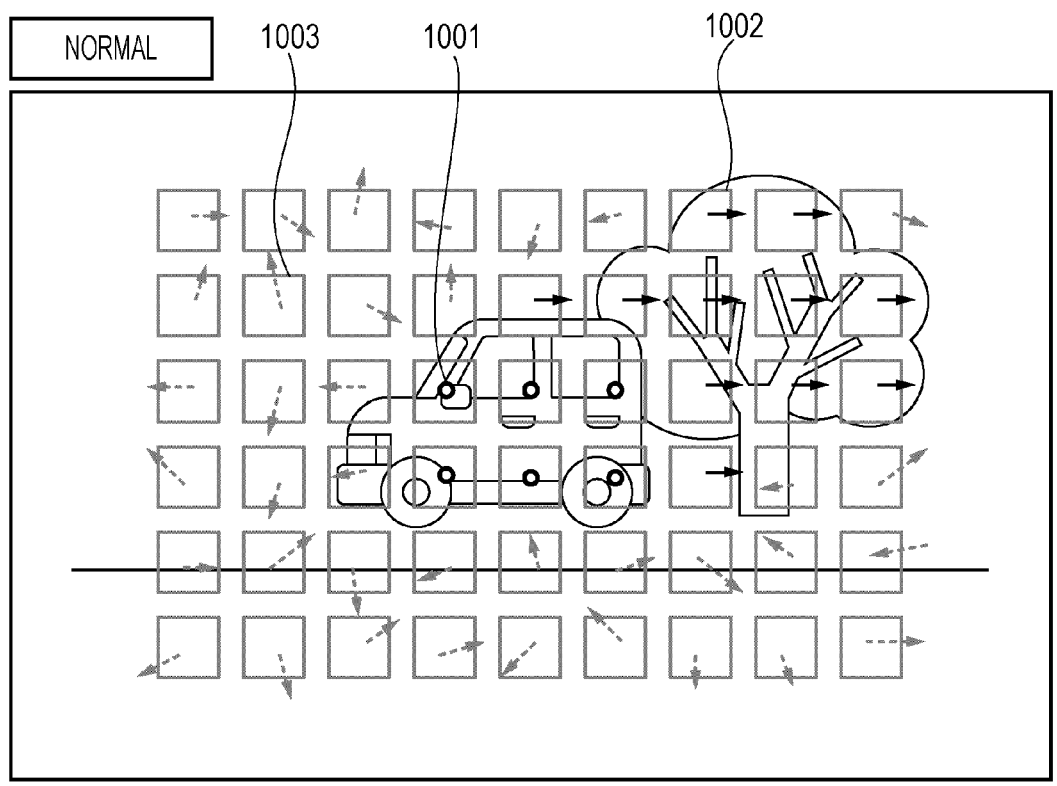
FIG. 9 illustrates an object of which size of a main object is discriminable and motion vectors.
Figure 10:
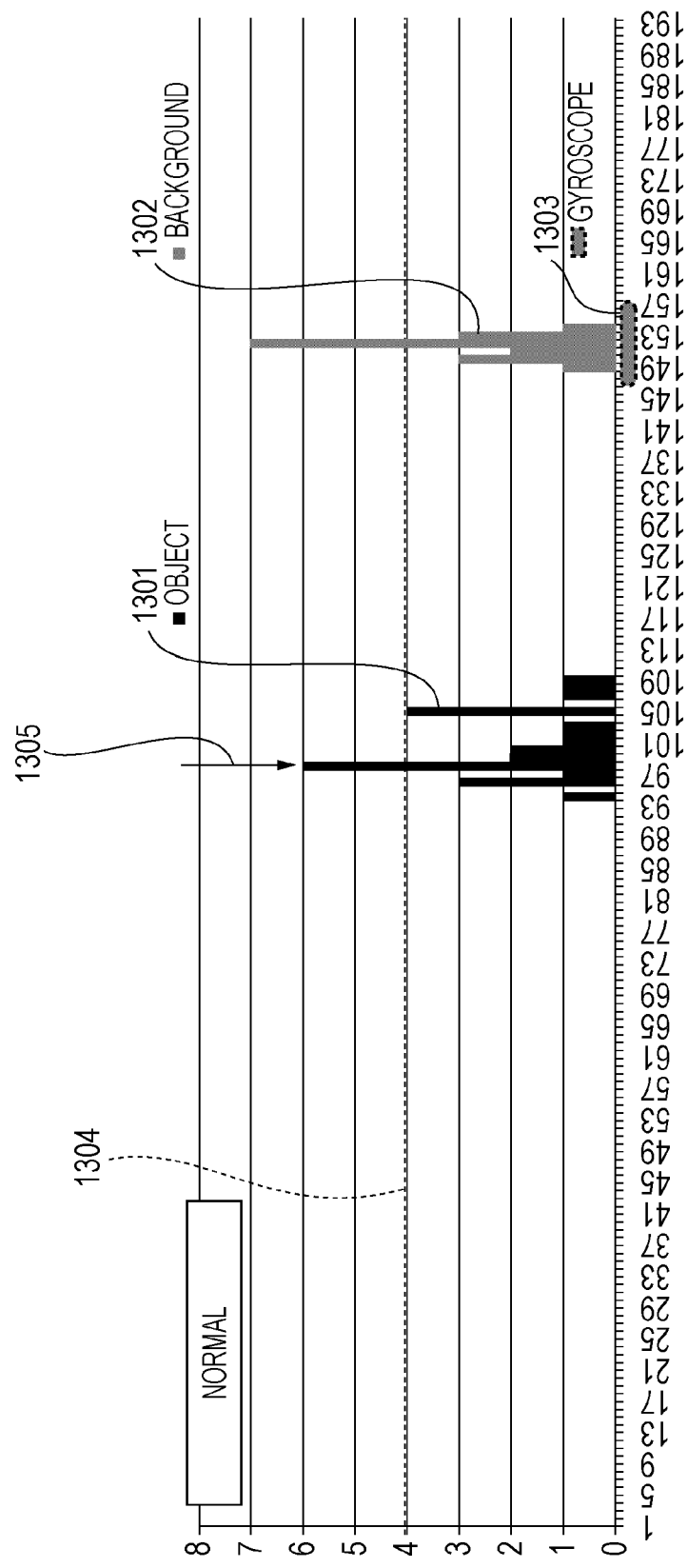
FIG. 10 illustrates a histogram with which a main object is discriminable.
Figure 11:
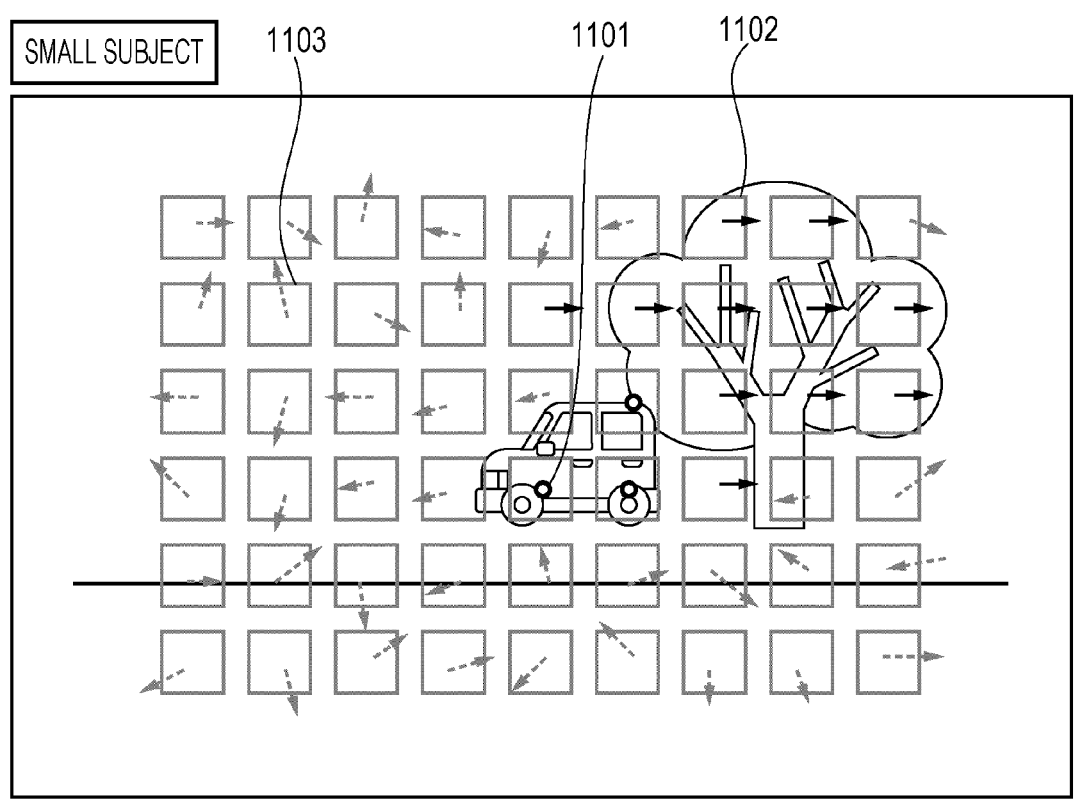
FIG. 11 illustrates an object of which size of a main object is difficult to discriminate and motion vectors.
Figure 12:
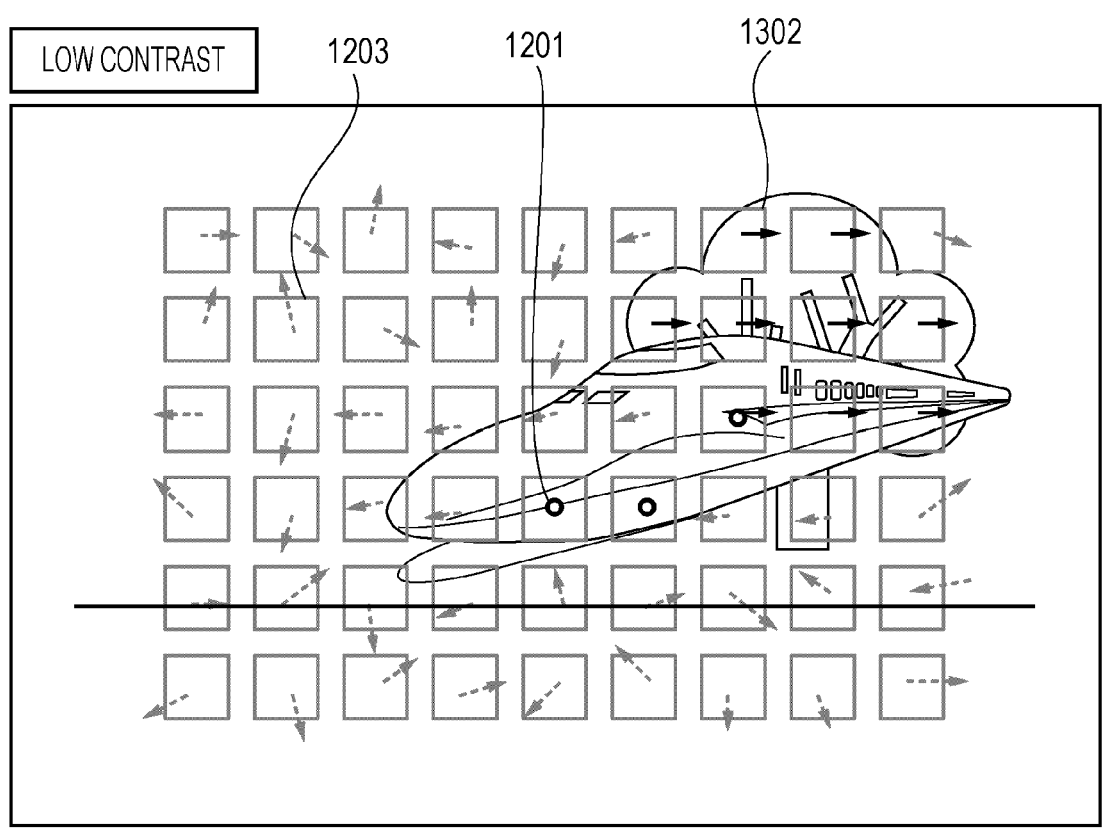
FIG. 12 illustrates a low contrast object and motion vectors.
Figure 13:
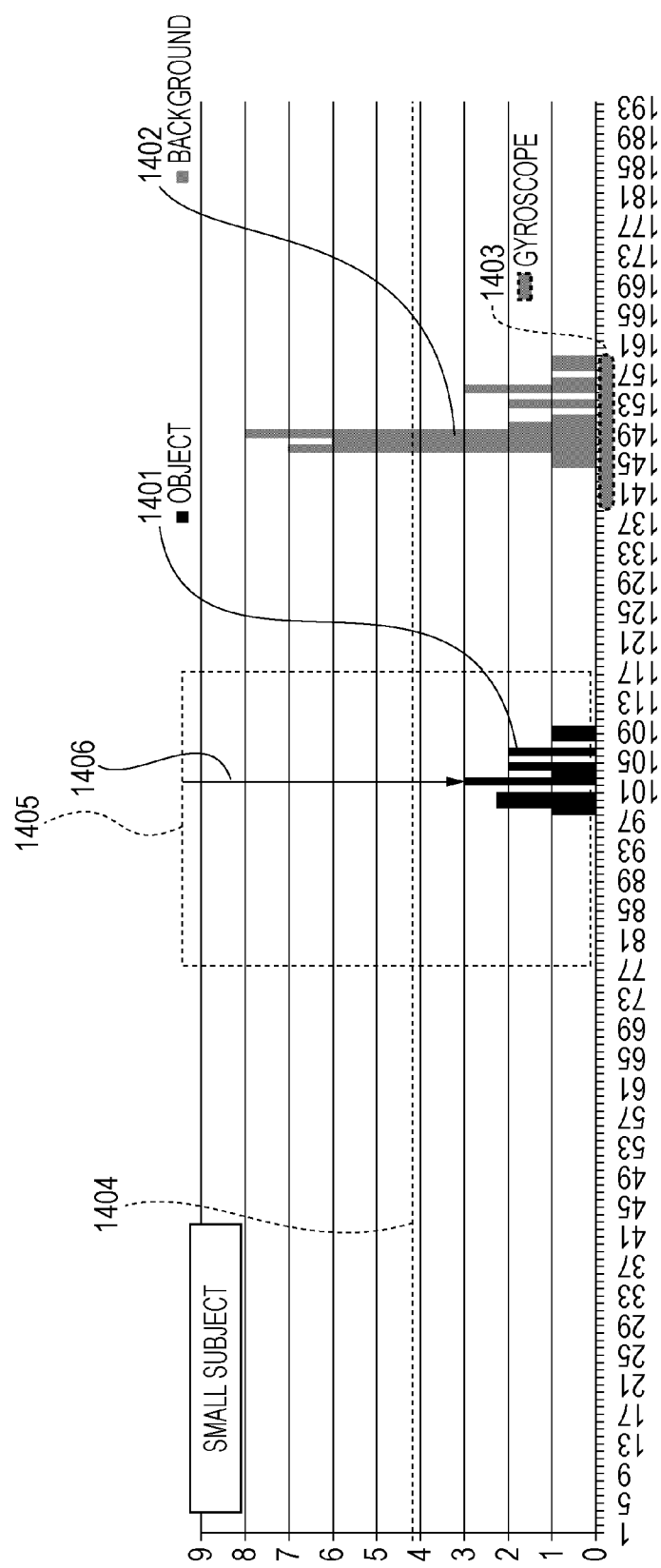
FIG. 13 illustrates a histogram in a case where a main object is difficult to discriminate.
Figure 14:
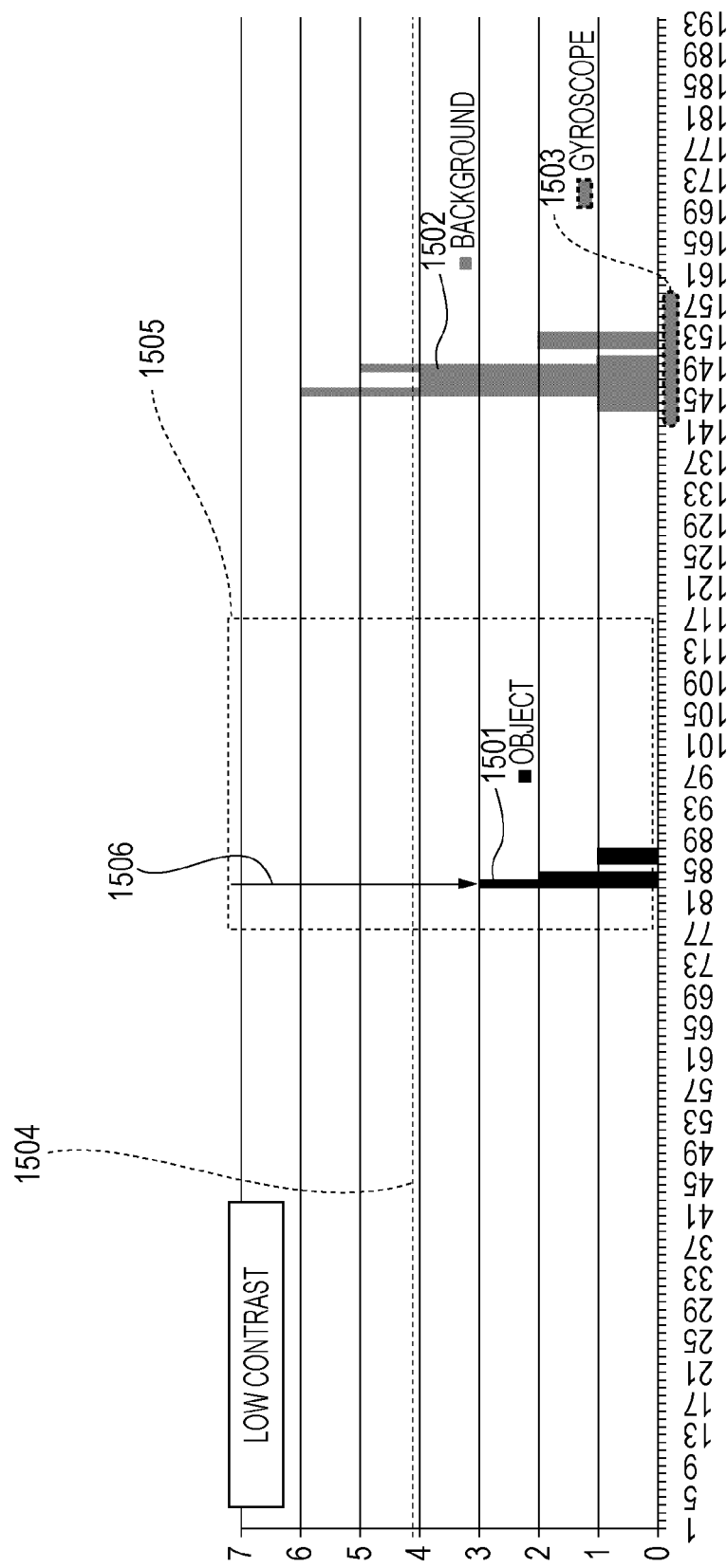
FIG. 14 illustrates a histogram in a case where a main object is difficult to discriminate.

A typical example in which detection of the main object is easy is illustrated in FIG. 9. In FIG. 9, a size of the object is large with respect to the angle of view, and a contrast of the object is high. Therefore, the number of motion vectors to be output is large and a possibility that the main object can be detected is high as illustrated in FIG. 10. However, in performing panning, the object may be small as illustrated in FIG. 11, or the object may have a low contrast as illustrated in FIG. 12. If the size of the object is small with respect to the angle of view, since the number of small regions overlapping the object among plural small regions for detecting the motion vectors as illustrated by squares in FIG. 9, the number of the motion vectors to be output is small. Therefore, as illustrated in FIG. 13, a possibility that a necessary number of the motion vectors to detect the main object cannot be obtained is high. Similarly, in a case where the contrast of the object is low, even if the number of the small regions overlapping the object for detecting the motion vectors is large, the motion vectors may be determined as noise because there is no contrast difference required at least to detect the motion vector. Therefore, as illustrated in FIG. 14, a possibility that a necessary number of the motion vectors to detect the main object cannot be obtained is high. In these cases, it is not that the motion vectors are not detected at all, but a possibility that a necessary number of motion vectors to determine as the main object cannot be detected is high.

If the main object cannot be determined, the following processing is performed in the present embodiment. Typically, the user can track the object to some extent by performing the panning operation, and a motion vector distribution of the main object is detected near 0. Therefore, in the present embodiment, if the main object is indiscriminable for the reason that the object is small or the contrast is low, the moving amount is calculated assuming that the center of gravity or the peak of the motion vectors near 0 corresponds to the main object. The motion vectors are treated as the motion vectors of the main object, and the angular velocity of the main object is calculated.

Figure 15:
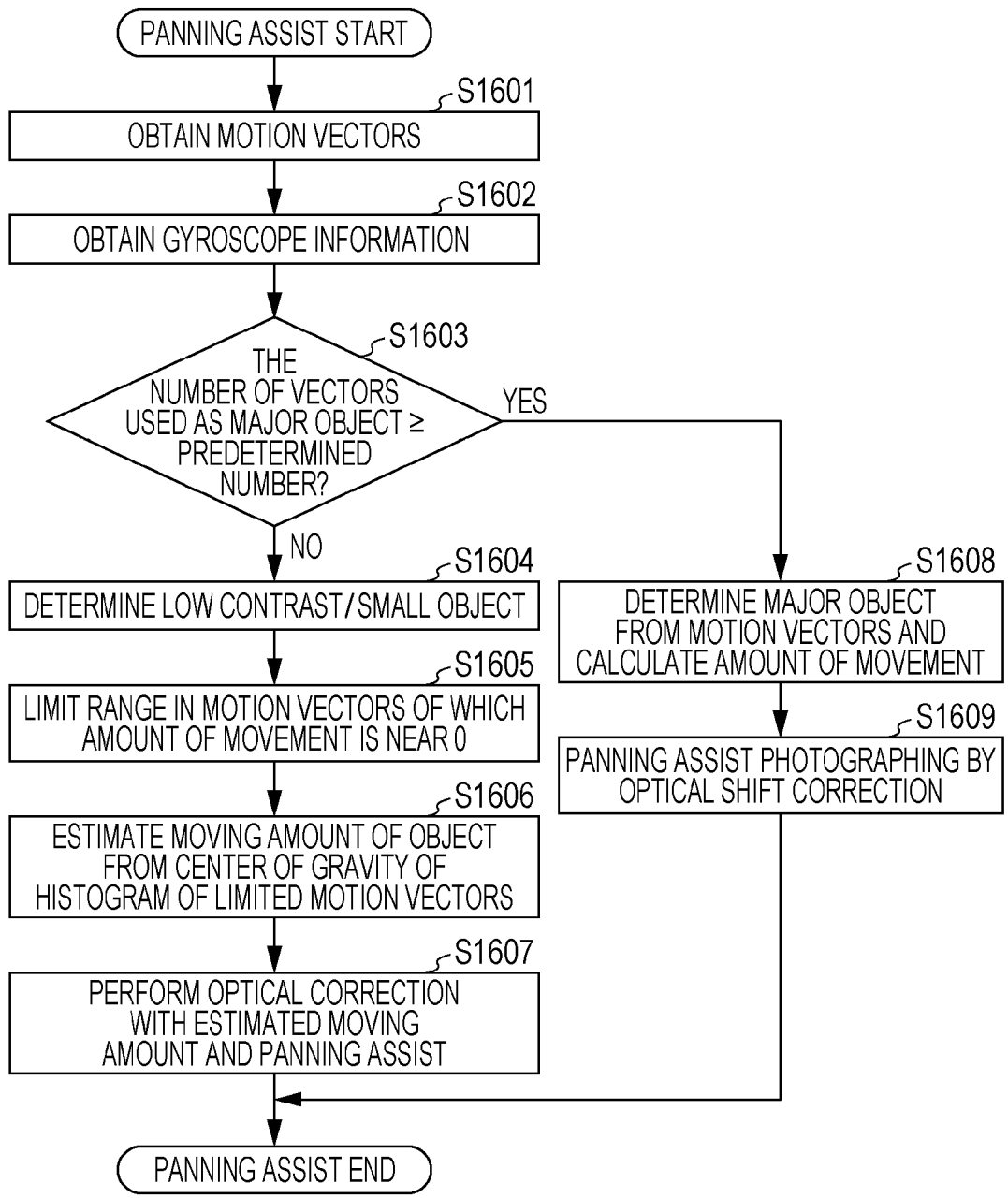
FIG. 15 is a flowchart illustrating a panning assist operation in the first embodiment.

FIG. 15 is a flowchart illustrating an operation of the panning assist in the present embodiment. When the panning assist is started, the motion vectors are detected in S1601 by the motion vector detection unit 141. In S1602, the angular velocity of the panning is obtained by the angular velocity sensor (a gyroscope) 111. In S1603, whether a minimum necessary number of the motion vectors to detect the main object has been obtained is determined. If a necessary number of motion vectors to detect the main object has been obtained, a motion angular velocity of the main object is obtained in S1608 from the motion vectors. In S1609, the shift lens group 104 is controlled to cancel the motion of the object during the exposure period, and panning assist for causing the object to be static is performed. If a necessary number of motion vectors to detect the main object has not been obtained, it is determined in S1604 that the object is a low contrast object or a small object with respect to the angle of view, and the routine proceeds to S1605. In S1605, a determination range of the histogram is limited to the motion vectors of which amount of movement is near 0 among the motion vectors detected from the image. In S1606, the moving amount of the object is predicted from the center of gravity of the histogram of the limited motion vectors. Finally, in S1607, the shift lens group 104 is controlled to cancel the motion of the object during the exposure period corresponding to the predicted moving amount, and panning assist is performed.

In the related art, in the user assist (assist) in panning, the user assist in panning is ceased when a necessary number of motion vectors for the determination of the main object is not detected (i.e., when the object is small with respect to the angle of view or the object is a low contrast object). According to the present embodiment, the moving amount of the main object can be predicted from a small amount of motion vectors in this case, and user assist in panning using the moving amount of the predicted main object is possible.

Second Embodiment

Hereinafter, a second embodiment of the present disclosure will be described. The present embodiment differs from the first embodiment in the following points. If a necessary number of motion vectors to detect the main object is not obtained (i.e., when the object is small with respect to the angle of view or the object is a low contrast object), a range of vectors used for the calculation of the center of gravity or the peak of the motion vectors near 0 is changed. In particular, the range is changed in proportion to an amount of movement detected by the angular velocity sensor 111 which detects the movement of the image capturing apparatus. If panning is performed to track an object of which motion is slow (small), tracking is easy and departure in tracking does not easily occur. Since a difference between the motion vectors of the background and the motion vectors of the main object is small, it is desirable to narrow the range of the motion vectors for calculating the center of gravity or the peak. If panning is performed to track an object of which motion is quick (large), tracking is difficult and departure in tracking often occurs. A difference between the motion vectors of the background and the motion vectors of the main object is large. Therefore, it is desirable to increase the range of the motion vectors for calculating the center of gravity or the peak. With this processing, vectors unnecessary for prediction of the main object can be excluded, whereby accuracy of prediction can be increased.

Figure 16:
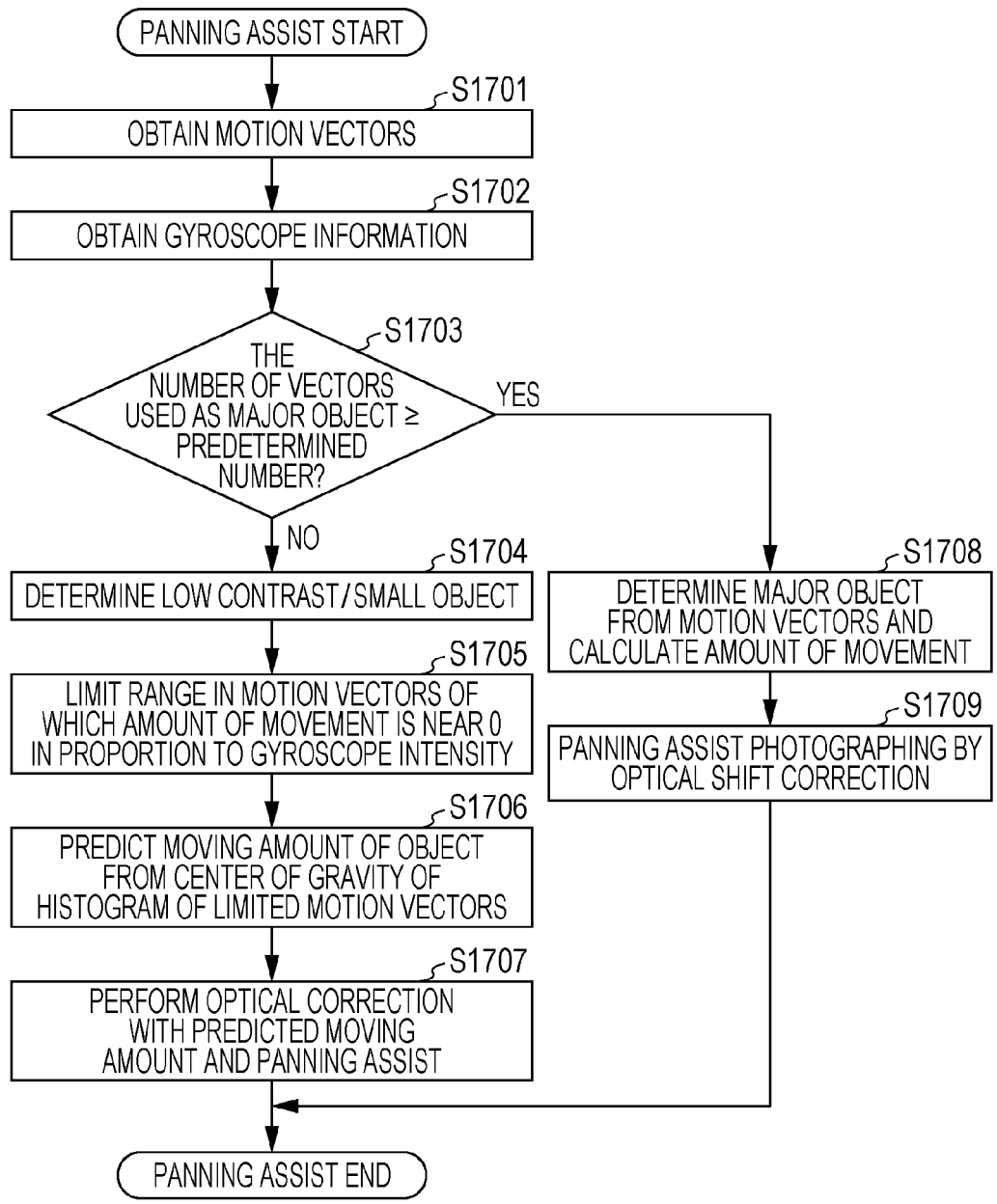
FIG. 16 is a flowchart illustrating a panning assist operation in a second embodiment.

FIG. 16 is a flowchart illustrating an operation of the panning assist in the present embodiment. When the panning assist is started, the motion vectors are detected in S1701 by the motion vector detection unit 141. In S1702, the angular velocity of the panning is obtained by the angular velocity sensor (a gyroscope) 111. In S1703, whether a minimum necessary number of the motion vectors to detect the main object has been obtained is determined. If a necessary number of the motion vectors to detect the main object has been obtained, a motion angular velocity of the main object is obtained in S1708 from the motion vectors. And in S1709, shift lens group 104 is controlled to cancel movement of object during exposure period, and panning assist which stops movement of object is performed. If a necessary number of motion vectors to detect the main object has not been obtained, it is determined in S1704 that the object is a low contrast object or a small object with respect to the angle of view, and the routine proceeds to S1705. In S1705, a creation range of the histogram of the motion vectors of which amount of movement is near 0 is limited in proportion to the angular velocity detected by the angular velocity sensor 111.

In S1706, the moving amount of the object is predicted from the center of gravity of the histogram of the limited motion vectors. Finally, in S1707, the shift lens group 104 is controlled to cancel the motion of the object during the exposure period corresponding to the predicted moving amount, and panning assist is performed.

As described above, in the present embodiment, prediction accuracy of the main object can be increased by changing the range of the motion vectors used to predict the motion vectors of the main object in proportion to the panning speed. Therefore, it is possible to provide user assist in panning with high accuracy also in a situation where user assist is ceased in the related art.

Third Embodiment

Hereinafter, a third embodiment of the present disclosure will be described. The present embodiment differs from the first embodiment in the following point. If a necessary number of motion vectors to detect the main object is not obtained (i.e., when the object is small with respect to the angle of view or the object is a low contrast object), it is determined which of the center of gravity and the peak of the motion vectors near 0 is used for the calculation. In particular, if plural peaks exist in the histogram of the motion vectors used for the calculation (a multipeak histogram), the center of gravity is calculated. If a single peak is output, the peak is used for the calculation. In this manner, calculation of the amount of movement suitable for a small number of motion vectors becomes possible, whereby prediction accuracy with a small number of vectors can be increased.

Figure 17:
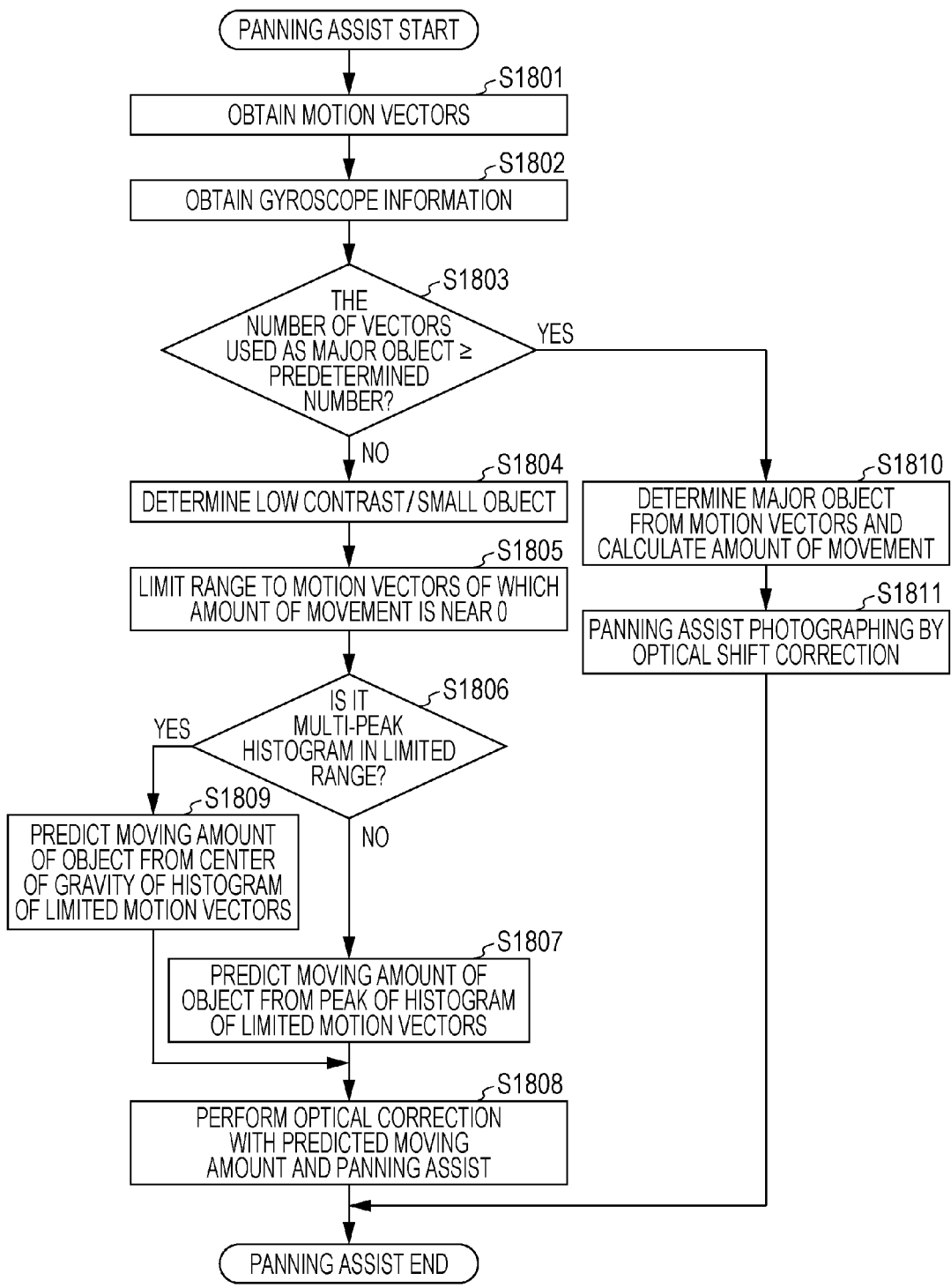
FIG. 17 is a flowchart illustrating a panning assist operation in a third embodiment.

FIG. 17 is a flowchart illustrating an operation of the panning assist in the present embodiment. When the panning assist is started, the motion vectors are detected in S1801 by the motion vector detection unit 141. In S1802, the angular velocity of the panning is obtained by the angular velocity sensor (a gyroscope) 111. In S1803, whether a minimum necessary number of the motion vectors to detect the main object has been obtained is determined. If a necessary number of the motion vectors to detect the main object has been obtained, a motion angular velocity of the main object is obtained in S1810 from the motion vectors. And in S1811, shift lens group 104 is controlled to cancel movement of object during exposure period, and panning assist which stops movement of object is performed. If a necessary number of motion vectors to detect the main object has not been obtained, it is determined in S1804 that the object is a low contrast object or a small object with respect to the angle of view, and the routine proceeds to S1805. In S1805, a range of the histogram is limited to the motion vectors of which amount of movement is near 0 among the motion vectors detected from the image.

In S1806, whether the histogram of the limited motion vectors is a multipeak histogram is determined. If the histogram is determined to be a multipeak histogram, In S1809, the moving amount of the object is predicted from the center of gravity of the histogram of the limited motion vectors. If the histogram is not determined to be a multipeak histogram in S1806, the peak of the histogram of the limited motion vectors is obtained, and the moving amount of the object is predicted from the motion vectors of the obtained peak in S1807. Finally, in S1808, the shift lens group 104 is controlled to cancel the motion of the object during the exposure period corresponding to the predicted moving amount, and panning assist is performed.

In the present embodiment, with this processing, the moving speed of the main object can be calculated with high accuracy by switching the calculation method depending on a distribution shape of the small number of vectors also in a situation in which the number of motion vectors is small. Therefore, it is possible to provide user assist in panning with high accuracy also in a situation where user assist is ceased in the related art.

Fourth Embodiment

Hereinafter, a fourth embodiment of the present disclosure will be described. The present embodiment differs from the first embodiment in the following points. If a necessary number of motion vectors to detect the main object is not obtained (i.e., when the object is small with respect to the angle of view or the object is a low contrast object), detection accuracy in the motion vectors near 0 is increased. In particular, when a panning speed is low due to inaccurate tracking by a user, an amount of movement of vectors of the object and vectors of the background may become close to each other. In such a case, detection accuracy in the vectors of the object is increased. As a method therefor, if vectors which can be determined from output of the angular velocity sensor 111 to be the vectors of the background overlap in a distribution range of the motion vector for calculating the center of gravity or the peak, the vectors of the background are not used for the determination of the amount of movement of the main object. That is, the center of gravity or the peak of the motion vectors is calculated by excluding the vectors of the background. In this manner, prediction accuracy of the main object can be increased while excluding an influence of the vectors of the background.

FIG. 18 is a flowchart illustrating an operation of the panning assist in the present embodiment. When the panning assist is started, the motion vectors are detected in S1901 by the motion vector detection unit 141. In S1902, the angular velocity of the panning is obtained by the angular velocity sensor (a gyroscope) 111. In S1903, whether a minimum necessary number of the motion vectors to detect the main object has been obtained is determined. If a necessary number of the motion vectors to detect the main object has been obtained, a motion angular velocity of the main object is obtained in S1910 from the motion vectors. And in S1911, shift lens group 104 is controlled to cancel movement of object during exposure period, and panning assist which stops movement of object is performed. If a necessary number of motion vectors to detect the main object has not been obtained, it is determined in S1904 that the object is a low contrast object or a small object with respect to the angle of view, and the routine proceeds to S1905. In S1905, a range of the histogram is limited to the motion vectors of which amount of movement is near zero (0) among the motion vectors detected from the image.

In S1906, it is determined whether vectors to be discriminated as the background from the angular velocity detected by the angular velocity sensor 111 in S1902 are included in the histogram of the limited motion vectors. If it is determined that the vector of the background are included, a moving amount of the object is predicted from the center of gravity of the histogram in which the vectors of the background are excluded from the limited motion vectors in S1909. If it is determined in S1906 that the vectors of the background are not included in the histogram of the limited motion vectors, the moving amount of the object is predicted from the center of gravity of the histogram of the limited motion vectors in S1907. Finally, in S1908, the shift lens group 104 is controlled to cancel the motion of the object during the exposure period corresponding to the predicted moving amount, and panning assist is performed.

With this processing, in the present embodiment, the moving speed of the main object can be calculated with high accuracy even in a small object with respect to an angle of view, a low contrast object, and an object of which moving speed is slow and having a small difference with the background. Therefore, it is possible to provide user assist in panning with high accuracy also in a situation where user assist is ceased in the related art.

Preferred embodiments of the present disclosure have been described, but the present disclosure is not limited to the same. Various modifications and changes may be made without departing from the scope of the present disclosure.

Although the difference between the movement of the camera and the motion of the object is canceled by the shift lens group 104 during panning in the above embodiments, the difference between the movement of the camera and the motion of the object may be canceled by moving the image pickup device. Alternatively, a variable vertex angle prism etc. may be used.

Other Embodiments

The present disclosure is applicable also to a process in which a program that performs one or more functions of the above-described embodiments is supplied to a system or an apparatus via a network or a storage medium, and one or more processors in a computer of the system or the apparatus read and execute the program. Further, the present disclosure is implementable in a circuit having one or more functions (e.g., ASIC).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-232264, filed Nov. 27, 2015, which is hereby incorporated by reference herein in its entirety.

What is claimed is:

1. An image blur correction apparatus comprising:
   at least one processor configured to function as:
   a first detection unit configured to detect motion vectors in plural different areas using a plurality of images,
   a determination unit configured to determine an amount of movement of a main object based on the motion vectors in the plural different areas detected by the first detection unit, and
   a control unit configured to correct an image blur of the main object based on the amount of movement of the main object determined by the determination unit,
   wherein the determination unit determines a center of gravity or a peak movement amount of which value is included in a determination range near zero (0) among plural amounts of movement represented by the motion vectors in the plural different areas to be the amount of movement of the main object.

2. The image blur correction apparatus according to claim 1, further comprising an angular velocity sensor configured to detect a movement of an image capturing apparatus which captures the plurality of images, wherein
   the determination unit changes the determination range depending on a detection result of the angular velocity sensor.

3. The image blur correction apparatus according to claim 2, wherein the determination unit narrows the determination range as the detection result of the angular velocity sensor shows that an amount of movement of the image capturing apparatus is smaller.

4. The image blur correction apparatus according to claim 1, wherein depending on distribution of the motion vectors in the plural different areas detected by the first detection unit, the determination unit switches between making the center of gravity of the movement amount included in the determination range be the amount of movement of the main object and making the peak of the movement amount included in the predetermined range be the amount of movement of the main object.

5. The image blur correction apparatus according to claim 4, wherein, if the movement amount included in the determination range has plural peaks, the determination unit makes the center of gravity of the movement amount included in the determination range to be the amount of movement of the main object.

6. The image blur correction apparatus according to claim 1,
   further comprising an angular velocity sensor configured to detect a movement of an image capturing apparatus which captures the plurality of images,
   wherein the determination unit determines a movement amount which is not used for the determination of the amount of movement of the main object in the movement amount included in the determination range depending on a detection result of the velocity angular sensor.

7. The image blur correction apparatus according to claim 6, wherein the determination unit specifies an amount of movement of a background depending on the detection result of the velocity angular sensor, and does not use the amount of movement of the specified background for the determination of the amount of movement of the main object in the movement amount included in the determination range.

8. A method for controlling an image blur correction apparatus, the method comprising:
  a first detection process to detect motion vectors of plural different areas using a plurality of images;
  a determination process to determine an amount of movement of a main object based on the motion vectors of plural different areas detected in the first detection process; and
  a control process to correct an image blur of the main object based on the amount of movement of the main object determined in the determination process, wherein
  the determination process determines a center of gravity or a peak movement amount of which value is included in a determination range near zero (0) among plural amounts of movement represented by the motion vectors in the plural different areas to be the amount of movement of the main object.

9. A non-transitory computer readable storage medium configured to store a program causing a computer to execute each steps of:
  a first detection process to detect motion vectors of plural different areas using a plurality of images;
  a determination process to determine an amount of movement of a main object based on the motion vectors of plural different areas detected in the first detection process; and
  a control process to correct an image blur of the main object based on the amount of movement of the main object determined in the determination process, wherein
  the determination process determines a center of gravity or a peak movement amount of which value is included in a determination range near zero (0) among plural amounts of movement represented by the motion vectors in the plural different areas to be the amount of movement of the main object.

10. An image blur correction apparatus comprising:
  at least one processor configured to function as:
  a first detection unit configured to detect motion vectors in plural different areas using a plurality of images;
  a determination unit configured to determine an amount of movement of a main object based on the motion vectors in the plural different areas detected by the first detection unit; and
  a control unit configured to correct an image blur of the main object based on the amount of movement of the main object determined by the determination unit,
  wherein the determination unit determines an amount of movement in a determination range among plural amounts of movement represented by the motion vectors in the plural different areas to be the amount of movement of the main object, and
  wherein the determination unit determines the determination range based on a detection result of an angular velocity sensor which detects a movement of an image capturing apparatus which captures the plurality of images.

11. The image blur correction apparatus according to claim 10, wherein the determination unit changes a width of the determination range based on the detection result of the angular velocity sensor.

12. The image blur correction apparatus according to claim 11, wherein the determination unit makes the determination range narrower in a case where the detection result of the angular velocity sensor indicates that an amount of movement of the image capturing apparatus is a second value smaller than a first value than in a case where the detection result of the angular velocity sensor indicates that the amount of movement of the image capturing apparatus is the first value.

13. A method for controlling an image blur correction apparatus, the method comprising:
  a first detection process to detect motion vectors of plural different areas using a plurality of images;
  a determination process to determine an amount of movement of a main object based on the motion vectors of plural different areas detected in the first detection process; and
  a control process to correct an image blur of the main object based on the amount of movement of the main object determined in the determination process,
  wherein the determination process determines an amount of movement in a determination range among plural amounts of movement represented by the motion vectors in the plural different areas to be the amount of movement of the main object, and
  wherein the determination process determines the determination range based on a detection result of an angular velocity sensor which detects a movement of an image capturing apparatus which captures the plurality of images.

* * * * *